United States Patent Office 3,133,954
Patented May 19, 1964

3,133,954
PROCESS FOR PREPARING CHLORINATED CYANOESTERS
Peter L. de Benneville, Philadelphia, and Heinz W. Blessing, Levittown, Pa., assignors to Rohm & Haas Company, Philadelphia, Pa., a corporation of Delaware
No Drawing. Filed Aug. 18, 1959, Ser. No. 834,408
4 Claims. (Cl. 260—465.4)

This invention deals with chlorinated cyanoesters and, more particularly, with 3,3-dichloro-3-cyanoesters. It further deals with a method for the preparation of these specific chlorinated cyanoesters.

The compounds of the present invention are represented by the formula

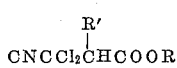

in which R represents primary and secondary alkyl groups of from one to eight carbon atoms, such as methyl, ethyl, propyl, isopropyl, n-butyl, n-octyl and 2-ethylhexyl. R' may be a hydrogen atom or a methyl group.

The compounds of this invention are produced by halogenating a compound having the formula

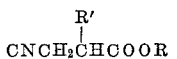

in which the symbols represent the same groups as discussed hereinbefore. Typical reactants include methyl 3-cyanopropionate, butyl 3-cyanopropionate, methyl 3-cyanoisobutyrate, propyl 3-cyanoisobutyrate, and isopropyl 3-cyanopropionate. By rigidly adhering to the reactants just defined, and employing the conditions to be more fully discussed hereinafter, consistently high yields of the desired product are repeatedly obtained. It is to be noted in this respect that, unlike many chlorinations known to the prior art, the present method produces a dichlorinated compound wherein the two chorine atoms are always located in the previously defined structural positions. There are no other chlorinated products produced by the present method in any appreciable amounts. The halogenation always occurs in the manner described. This specificity apparently arises from the structural condition

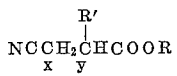

in which we have surprisingly found that reaction is favored to replace the hydrogen atoms on the carbon atom labeled x, and replacement of the hydrogen on the carbon atom labeled y is inhibited. In the absence of this structural condition, chlorinations are notoriously indiscriminate.

The present process is conducted by passing the chlorine into a reaction vessel containing a cyanoester reactant. The chlorine may be employed in a liquid or a gaseous form, but it is preferred to use it in the gaseous form and bubble it up through the cyanoester reactant. It is desirable to saturate the reaction medium with hydrogen chloride in gaseous form and substantially dry before the introduction of the halogen itself. We have also found it sometimes advantageous to introduce hydrogen chloride in small amounts along with the chlorine. Particularly towards the end of the reaction, it appears to be preferable to maintain the reaction mixture in a condition of saturation with hydrogen chloride. This provides a more rapid reaction at this final stage.

The reaction is carried out in the substantial absence of actinic light although the presence of diffuse light is not objectionable. The reaction is continued until no more chlorine is taken up by the system, as will be clear to one skilled in the art. This will, in general, correspond to a gain in weight slightly more than required for the absorption of two atoms of chlorine because of the presence of dissolved gases.

It may be desirable in some instances to use small amounts of metallic chlorides in order to expedite the reaction, but such is not necessary. In this respect, there may be used zinc chloride, aluminum chloride, and the like.

The reaction is exothermic in nature and no heat need be added. In fact, it is desirable to conduct the reaction at a temperature no higher than 125° C. and preferably in the range of 35° to 85° C. Halogenation starts to occur in appreciable amounts at about 20° C. At the conclusion of the reaction, the reaction system is purged with nitrogen gas. The product may be further purified, if desired, by distillation.

The products of this invention are especially valuable as herbicides and are quite effective against dicotyledonous plants in both pre-emergence and post-emergence applications. These compounds are more effective when employed in post-emergence applications, according to standard procedures. The compounds of this invention are also useful herbicides against monocotyledonous plants, particularly in post-emergence applications. Maximum results are obtained when the present products are used in concentrations of about 10 pounds per acre and applied either as a spray, wettable powder, or dust in the known inert carriers. Particularly outstanding are the compounds in which R stands for methyl or ethyl and R' represents hydrogen. The products of this invention, when applied at the rate of 10 pounds per acre, give complete control of crab grass, millet, wild carrot, and pigweed and give excellent control of foxtail, lambs quarter, sorrel, dock, and mallow.

The compounds are also pesticides, being effective, for example, in the control of many pathogenic soil bacteria, fungi and leaf-chewing insects.

The compounds are useful chemical intermediates. They can be dehydrohalogenated, for example, to the corresponding β-halo-β-cyanoacrylic and methacrylic esters by the action of tertiary amines in equimolar amount, or of amine hydrochlorides in catalytic amount, as shown in the co-filed patent application, Serial No. 834,409. The latter compounds are even more effective herbicides than the subject compounds. They are also liquids with unusual ability to dissolve highly polar molecules, such as acetylene and polyacryonitrile.

When the dichlorocyanopropionic esters are treated with alkanols in the presence of two equivalents of bases, such as alkali hydroxides, there are formed α-alkoxy-β-cyanoacrylic esters:

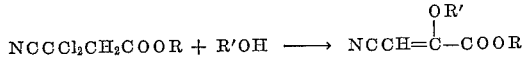

These compounds, particularly in those cases where R or R' or both are alkyl groups containing from 8 to 18 carbon atoms, are useful plasticizers for polyvinyl chloride.

When the dichlorocyanopropionic esters are treated with sulfuric acid in excess and hydrolyzed, there is produced a mixture of chloromaleic acid and chlorofumaric acid which can be used for the preparation of polyester plasticizers and polyester resins.

The present invention may be more fully understood by the following examples which are offered by way of illustration and not by limitation. Parts by weight are used throughout.

*Example 1*

A mixture of methyl β-cyanoisobutyrate (127 parts) and anhydrous zinc chloride (3.5 parts) is saturated with hydrogen chloride for 20 minutes. Chlorine is then passed into the reaction mixture for a total of 65 hours at 30° to 60° C., after which time, no more chlorine is absorbed. The gain in weight corresponds to the absorption of a little more than one mole (73 parts) of chlorine. After removing dissolved chlorine by passing a stream of nitrogen through the reaction mixture, the product is distilled under vacuum to give methyl 3-cyano-3,3-dichloroisobutyrate (150 parts), B.P. 95° to 96° C./10 mm. Hg, $n_D^{25}=1.4518$. The product contains 35.7% chlorine (36.2% theoretical) and 7.1% nitrogen (7.1% theoretical).

In similar manner, from ethyl β-cyanoisobutyrate (141 parts), there is obtained ethyl 3-cyano-3,3-dichloroisobutyrate, B.P. 60° to 68° C./0.5 mm. In the same way, from n-butyl-β-cyanoisobutyrate, there is obtained after removal of dissolved chlorine a yellow oil consisting primarily of n-butyl-3-cyano-3,3-dichloroisobutyrate, and analyzing correctly for this product.

*Example 2*

Into a mixture of 452 parts of methyl 3-cyanopropionate and 10 parts of anhydrous zinc chloride is passed chlorine gas along with one part per hundred of hydrogen chloride, for a total of 31 hours. The temperature rises to about 105° and then falls slowly so that, at the end of the reaction mixture, it is at room temperature. The increase in weight, 330 parts, includes chlorinated product and some dissolved gas. After the product is degassed under vacuum and heat (to 100° at 15 mm.), the weight gain corresponds to an uptake of about 268 parts of chlorine, or 97% of the theoretical. The product is then distilled through a 4-inch column packed with glass helices to give 599 parts of methyl 3-cyano-3,3-dichloropropionate, B.P. 100° to 106° C. at 16 mm. Hg. On standing, the product crystallizes. When pressed out on a porous plate, it melts at 36° to 37° C. The super-cooled liquid has $n_D^{25}$ of 1.4532. The product contains 39.1% chlorine (39.0% theoretical) and 7.68% nitrogen (7.69% theoretical).

In the same way, but omitting the zinc chloride, from ethyl 3-cyanopropionate there is obtained an almost quantitative yield of a slightly yellow liquid, boiling at 54° to 63° C. at 0.5 mm. Hg, and analyzing correctly for ethyl 3-cyano-3,3-dichloropropionate.

In a similar way, chlorine and hydrogen chloride are passed into 2-ethylhexyl 3-cyanopropionate until the weight gain corresponds to 110% of the theoretical value for absorption of one mole of chlorine per mole of ester. After removal of the dissolved gases, there remains a yellow liquid containing about 25% chlorine and 5% nitrogen, corresponding to the theoretical values for 2-ethylhexyl 3-cyano-3,3-dichloropropionate.

In like manner, from 2-ethylhexyl 3-cyanoisobutyrate and chlorine, there is prepared 2-ethylhexyl 3-cyano-3,3-dichloro-2-methylpropionate.

We claim:
1. A method for the preparation of a compound having the formula

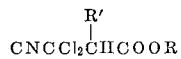

in which R represents a member from the group consisting of primary and secondary alkyl groups of from one to eight carbon atoms and R' is a member from the class consisting of hydrogen and a methyl group, which comprises reacting chlorine in the presence of hydrogen chloride with a compound having the formula

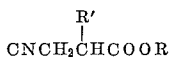

in a temperature range of 20° to 125° C. in the absence of actinic light.

2. A method according to claim 1 in which the temperature is 35° to 85° C.

3. A method according to claim 1 in which the reaction medium is saturated with hydrogen chloride.

4. A method for the preparation of a compound having the formula.

in which R represents a member from the group consisting of primary and secondary alkyl groups of from one to eight carbon atoms, which comprises reacting chlorine in the presence of hydrogen chloride with a compound having the formula

in a temperature range of 20° to 125° C. in the absence of actinic light.

References Cited in the file of this patent

UNITED STATES PATENTS

| | | |
|---|---|---|
| 2,461,990 | Lichty | Feb. 15, 1949 |
| 2,745,868 | Kabisch | May 15, 1956 |

FOREIGN PATENTS

| | | |
|---|---|---|
| 962,071 | Germany | Apr. 18, 1957 |

OTHER REFERENCES

Beilsteins Handbuch der Organischen Chemie, volume 2, page 615 (1920).
Treibs et al.: Ber., volume 90, pages 1146–1152 (1957).